United States Patent
Lee et al.

(10) Patent No.: US 7,711,199 B2
(45) Date of Patent: May 4, 2010

(54) METHOD FOR ESTIMATING QUANTIZATION FACTOR OF COMPRESSED DIGITAL IMAGE

(75) Inventors: Sangkeun Lee, Irvine, CA (US);
Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1084 days.

(21) Appl. No.: 11/378,713

(22) Filed: Mar. 16, 2006

(65) Prior Publication Data

US 2007/0217705 A1 Sep. 20, 2007

(51) Int. Cl.
- G06K 9/00 (2006.01)
- G06K 9/40 (2006.01)
- H04B 1/66 (2006.01)
- H04N 7/12 (2006.01)
- H04N 11/02 (2006.01)
- H04N 11/04 (2006.01)

(52) U.S. Cl. .................. 382/251; 382/268; 375/240.03

(58) Field of Classification Search ................ 382/251, 382/268; 375/240.03
See application file for complete search history.

(56) References Cited

U.S. PATENT DOCUMENTS

| | | | | |
|---|---|---|---|---|
| 6,810,083 B2* | 10/2004 | Chen et al. | ............. | 375/240.25 |
| 6,823,089 B1* | 11/2004 | Yu et al. | ............. | 382/268 |
| 6,898,321 B1* | 5/2005 | Knee et al. | ............. | 382/235 |
| 7,187,805 B1* | 3/2007 | Fan et al. | ............. | 382/251 |
| 7,277,484 B2* | 10/2007 | Kim et al. | ............. | 375/240.04 |
| 7,412,109 B2* | 8/2008 | Kong et al. | ............. | 382/261 |
| 2003/0099290 A1* | 5/2003 | Chen | ............. | 375/240.03 |
| 2004/0114685 A1* | 6/2004 | Kouloheris et al. | ............. | 375/240.03 |
| 2005/0100236 A1* | 5/2005 | Kong et al. | ............. | 382/261 |
| 2005/0111552 A1* | 5/2005 | Sugio et al. | ............. | 375/240.16 |
| 2005/0141773 A1* | 6/2005 | Mizuno | ............. | 382/239 |
| 2006/0257037 A1* | 11/2006 | Samadani | ............. | 382/251 |

OTHER PUBLICATIONS

Wang, Z.—"No-reference perceptual quality assessment of JPEG compressed images"—IEEE—2002, pp. 477-480.*
Wu, H.—"A generalized Block-Edge impairment metric for video coding"—IEEE—1997, pp. 317-320.*
Wang, Z.—"Blind measurement of blocking artifacts in images"—IEEE—2000, pp. 981-984.*

* cited by examiner

Primary Examiner—Aaron W Carter
Assistant Examiner—Bernard Krasnic
(74) Attorney, Agent, or Firm—Kenneth L. Sherman, Esq.; Michael Zarrabian, Esq.; Myers Andras Sherman LLP

(57) ABSTRACT

An estimation system provides quality measure of a given image for image/video applications to determine if the image needs to be enhanced or not. The system systemically measures the image quality by estimating quantization parameter of the compressed digital image. This allows estimating the image quantization parameter effectively in the pixel domain. Because block artifact are caused by image compression transforms, especially in flat image region, the estimation system first detects the suspicious regions of the image for the block artifacts by calculating a variance for each location in the image. Next, noise power is computed by using the detected regions. Then, the estimated noise power is compared with the statistical model to calculate the quantization parameter that is used in the encoder side when the input image is compressed. Finally, a quantization parameter is used as a quality measure of the input image.

4 Claims, 6 Drawing Sheets

METHOD FOR ESTIMATING QUANTIZATION FACTOR OF COMPRESSED DIGITAL IMAGE

FIELD OF THE INVENTION

The present invention relates generally to digital image processing, and more particularly to a method and apparatus for systemically measuring the image quality by estimating quantization parameter of the compressed digital image.

BACKGROUND OF THE INVENTION

Block artifacts are due to the information loss of high frequency energy, and appear as sharp discontinuities over the entire image especially on a relatively flat background. The information loss of an original image is due to the quantization process when the image is compressed, and the quantization noise is proportional to quantization size. If the quantization size (scale or parameter) is known, the presented artifacts including block and ringing effects can be effectively reduced or removed. Unfortunately, a decoded image of the compressed input does not provide the information to the consumer products particularly in Television. Conventional systems typically use the quantization parameter obtained directly from a decoder, and apply it to estimate some measures according to their applications. However, the compression information such as quantization of a decoded image is not available in the decoded image.

BRIEF SUMMARY OF THE INVENTION

An object of the present invention to provide the quality measure of a given image for image/video applications to determine if the image needs to be enhanced or not.

In one embodiment the present invention provides a method and system for systemically measuring the image quality by estimating quantization parameter of the compressed digital image. This allows estimating the image quantization parameter effectively in the pixel domain.

Generally, block artifact are caused by image compression transforms, especially in flat image region. As such, according to a preferred embodiment of the present invention, first the suspicious regions of the image for the block artifacts are detected by calculating a variance for each location in the image. Next, noise power is computed by using the detected regions. Then, the estimated noise power is compared with the statistical model to calculate the quantization parameter that is used in the encoder side when the input image is compressed. Finally, a quantization parameter is used as a quality measure of the input image.

Accordingly, the present invention provides a method to estimate the quantization parameter effectively in the pixel domain.

These and other features, aspects and advantages of the present invention will become understood with reference to the following description, appended claims and accompanying figures.

DETAILED DESCRIPTION OF THE INVENTION

Figure 1:
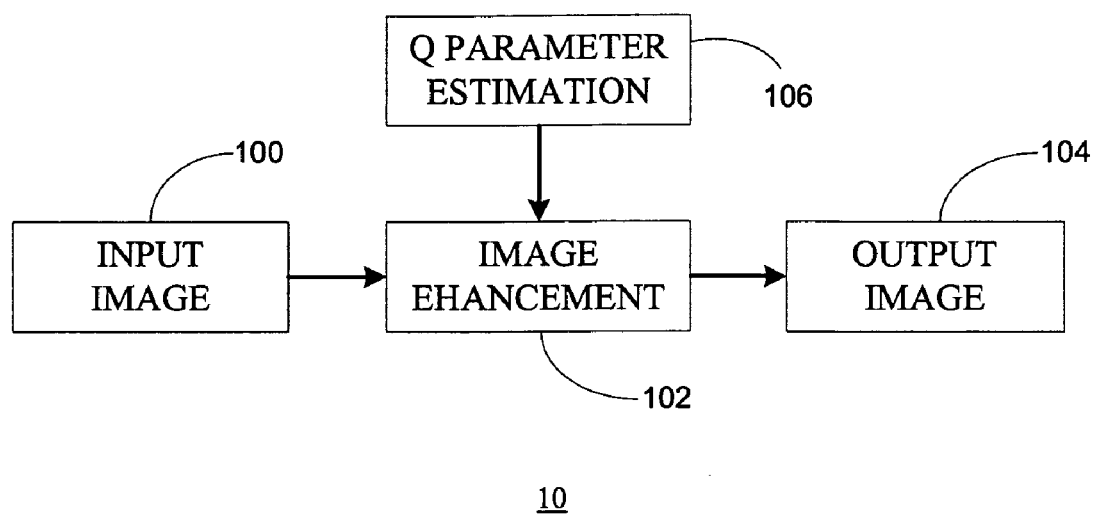
FIG. 1 shows a functional block diagram of an embodiment of an image processing system implementing an image processing, according to the present invention.

To better understand the present invention, in the following initially a theoretical background to picture quality indicating based on MPEG bitstream parameters, in particular quantization parameters, is provided.

It is assumed that the noise being estimated is due to discrete cosine transform (DCT) coefficient quantization in the MPEG coding process. Block artifacts are due to the information loss of high frequency energy, and appear as sharp discontinuities over the entire image especially on a relatively flat background. The information loss of an original image is due to the quantization process when the image is compressed, and the quantization noise is proportional to quantization size. If the quantization size (scale or parameter) is known, the presented artifacts including block and ringing effects can be effectively reduced or removed. Unfortunately, a decoded image of the compressed input does not provide the information to the consumer products particularly in Television.

As such, in one embodiment the present invention provides a method to estimate the quantization parameter effectively in the pixel domain. The quantization noise power is estimated in the pixel domain. The first point to establish is that, for a transform-based compression scheme such as MPEG, this is equivalent to estimating the noise power in the transformed coefficient domain. Because the transform is orthogonal, Parseval's theorem can be invoked to show that the noise power in one domain is directly proportional to the noise power in the other domain, provided factors such as the quantization weighting matrices are taken into account correctly.

In one example implementation of the method of the present invention, first the suspicious regions of the image for the block artifacts are detected by calculating a variance for each location in the image. Next, noise power is computed by using the detected regions. Then, the estimated noise power is compared with the statistical model to calculate the quantization parameter that is used in the encoder side when the input image is compressed. Finally, a quantization parameter is used as a quality measure of the input image.

As such, a method of systemically measuring the image quality according to the present invention estimates quantization level (scale) for a decoded digital image in the pixel domain without any prior knowledge of the original compressed image. The present invention utilizes the Parseval's theory which states that the noise power in one domain is directly proportional to the noise power in the other domain.

Color video signals usually comprise three color channels, these being one luminance (Y) channel and two chrominance (U, V) channels. Generally, quantization parameter estimation is only required to be performed on the luminance channel. Conventional systems typically utilize eight bits to represent the Y value due to bandwidth efficiency and memory design considerations. Therefore, conventional image processing systems assign each pixel a Y value somewhere in the range of 0 to 255, with 0 representing the darkest luminance and 255 representing the brightest luminance.

Applying the method of the present invention on the chrominance channels (U, V) have little or no noticeable effect on estimating a quantization parameter. FIG. 1 shows a block diagram of an example image processing system 10 which implements an embodiment of the method of the present invention. The decoded luminance data is read in from a buffer in an input image processor 100 to an image enhancer 102. The enhancer 102 improves the input data based on output of a parameter estimator 106 which estimates a quantization parameter, according to an embodiment of the present invention. The filtered luminance data from the enhancer 102 is provided to an output processing module 104 for combining with the decoded data from the two chrominance channels before being displayed.

Figure 2:
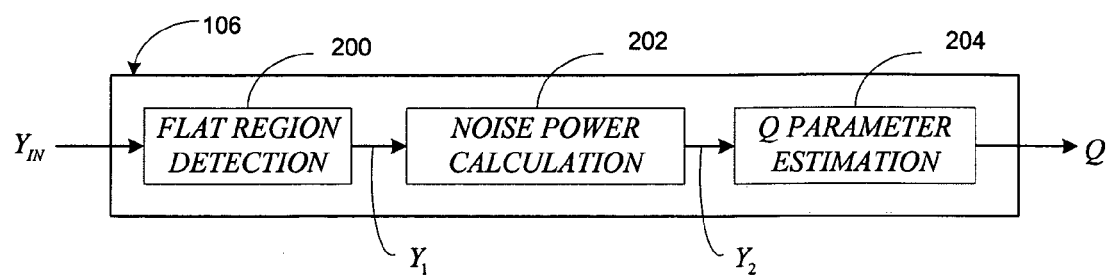
FIG. 2 shows a functional block diagram of an embodiment of quantization parameter estimation, according to the present invention.
Figure 3:
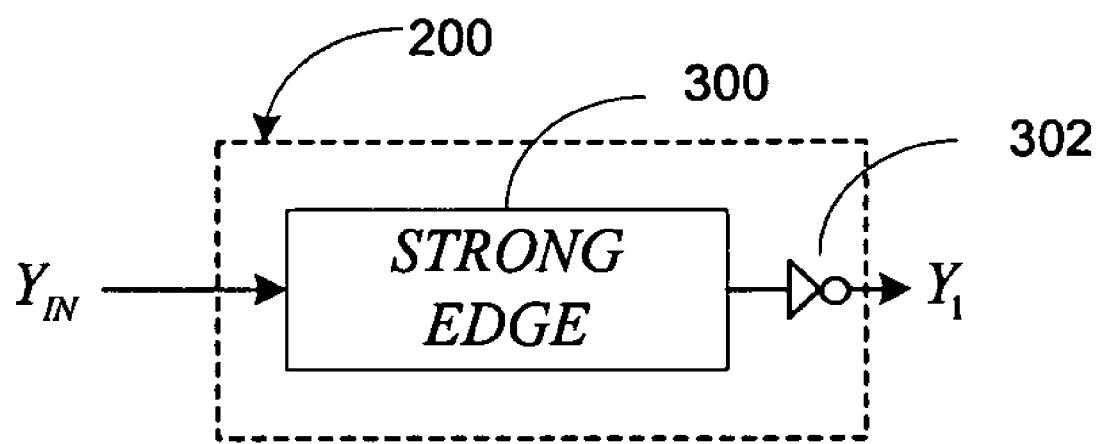
FIG. 3 shows a functional block diagram of an embodiment of flat region detection, according to the present invention.
Figure 4:
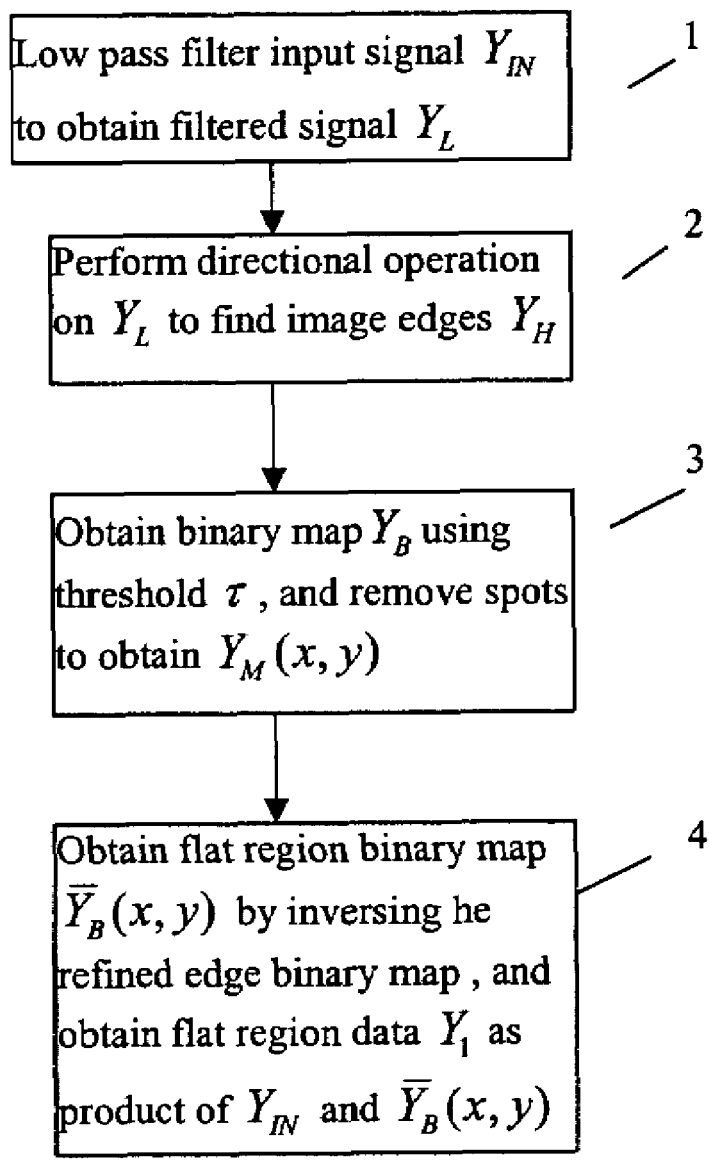
FIG. 4 shows a flowchart of example steps implemented in the strong edge detector of FIG. 3.

FIG. 2 is a block diagram of an embodiment of the quantization parameter estimator 106, comprising a flat region detector 200, a noise power calculator 202, and a parameter estimator 204. In particular, the flat region detector 200 first finds strong edges or texture regions in the image and then excludes those regions to generate relatively homogeneous regions. An example implementation of this process is shown in FIG. 3. The block artifacts caused by image compression are more significant in the homogeneous areas. A strong edge detector 300 processes the input signal $Y_{IN}$ according to the following steps 1-4 as shown in the flowchart of FIG. 4:

1. The input signal $Y_{IN}$ is low-pass filtered with using a n×m window at each pixel location (x, y) to generate a filtered signal $Y_L$ according to relation (1):

$$Y_L(x, y) = \frac{1}{n \times m} \cdot \sum_{i=0}^{n-1} \sum_{j=0}^{m-1} Y_{IN}(x + i, y + j). \quad (1)$$

2. Next, commonly used four directional sobel operators are performed on the low-pass-filtered image $Y_L(x, y)$ to find image edges $Y_H$ according to relation (2):

$$Y_H(x, y) = \frac{1}{4}\sum_{k=1}^{4}\sum_{i=-1}^{1}\sum_{j=-1}^{1} \text{abs}(M_k(i, j) \cdot Y_L(x + i, y + j)). \quad (2)$$

wherein, abs(·) indicates an absolute value of (·), $M_k(i,j)$ is the $k^{th}$ sobel operator according to relation set (3) below, wherein each sobel operator/filter is used to obtain edge information:

$$M_1(i, j) = \begin{bmatrix} 1 & 0 & -1 \\ 1 & 0 & -1 \\ 1 & 0 & -1 \end{bmatrix}, M_2(i, j) = \begin{bmatrix} 1 & 1 & 1 \\ 0 & 0 & 0 \\ -1 & -1 & -1 \end{bmatrix}, \quad (3)$$

$$M_3(i, j) = \begin{bmatrix} 1 & 1 & 0 \\ 1 & 0 & -1 \\ 0 & -1 & -1 \end{bmatrix}, \text{ and } M_4(i, j) = \begin{bmatrix} 0 & -1 & -1 \\ 1 & 0 & -1 \\ 1 & 1 & 0 \end{bmatrix}.$$

3. Obtain a binary map $Y_B$ using a threshold with a user defined value τ according to relation (4):

$$Y_B(x, y) = \begin{cases} 1 & \text{if } Y_H(x, y) > \tau, \\ 0 & \text{otherwise.} \end{cases} \quad (4)$$

Then, morphological operation opening (i.e., an erosion followed by a dilation) is performed in order to remove small spots caused by noisy information of the original input and refine the edge regions to obtain refined edge regions $Y_M(x,y)$.

4. Finally, a flat region binary map is obtained by inversing the refined edge binary map as the in inverter 302 (FIG. 3) according to relation (5) to obtain flat region map from edge map:

$$\overline{Y}_B(x,y)=1-Y_M(x,y), \quad (5)$$

wherein a flat region data $Y_1$ is further obtained by multiplying the original input $Y_{IN}$ and the flat region binary map $\overline{Y}_B(x,y)$ (i.e., $Y_1=Y_{IN}\cdot\overline{Y}_B(x,y)$). Therefore, $Y_1$ output from the flat region detector 200 indicates only flat areas in the input image $Y_{IN}$.

Figure 5:
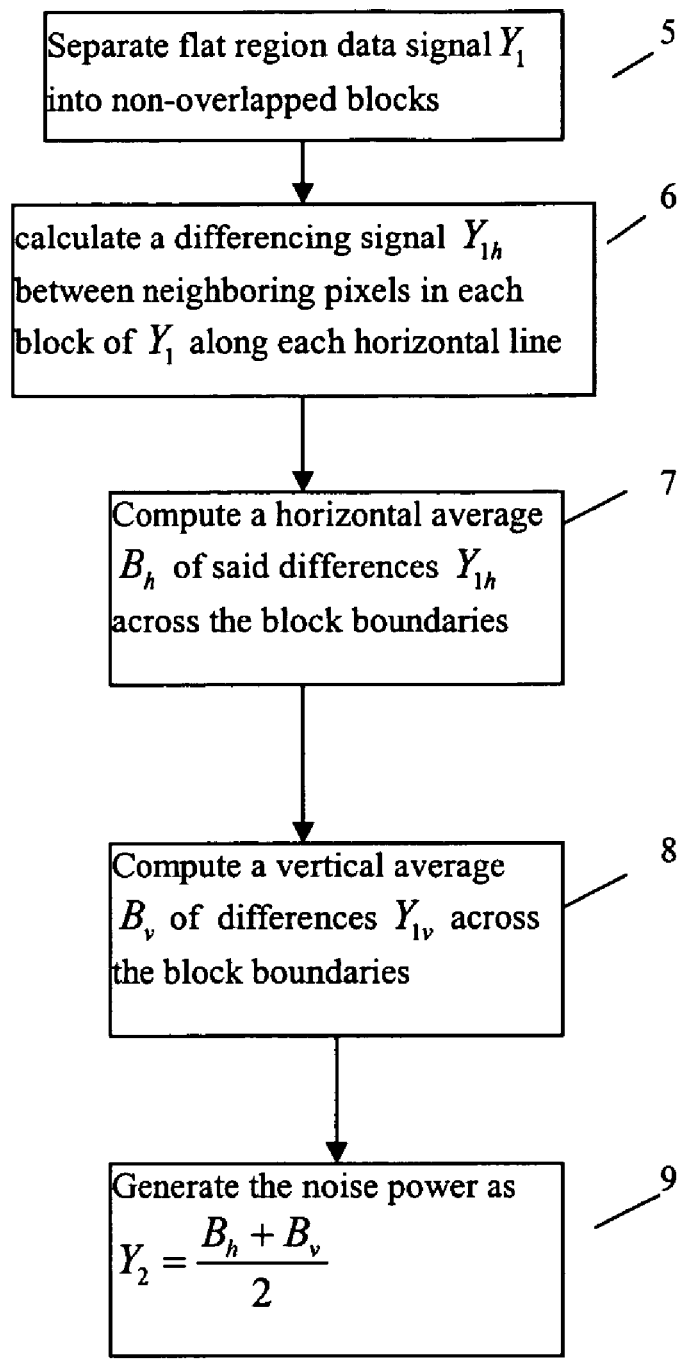
FIG. 5 shows a flowchart of example steps implemented in the noise power calculator of FIG. 2.

Referring back to FIG. 2, the noise power calculator 202 receives the flat region data signal $Y_1$ and generates noise power $Y_2$ around the block boundaries where the block artifacts are significant. To calculate the noise power $Y_2$, the noise power calculator 202 performs the following steps 5-9 shown in FIG. 5:

5. Separate the image represented by the flat region data signal $Y_1$ into non-overlapped blocks of pixels. In the MPEG, the block size is 8×8.

6. For computation simplicity, we denote the flat region $Y_1(x,y)$ signal as $M_F \times N_F$ rectangular area for $x \in [1,M_F]$ and $y \in [1,N_F]$, and calculate a differencing signal $Y_{1h}$ between neighboring pixels in each block along each horizontal line according to relation (6):

$$Y_{1h}(x,y)=Y_1(x,y)-Y_1(x,y-1) \text{ for } y\in[1, N_F-1]. \quad (6)$$

7. Compute an average $B_h$ of said differences $Y_{1h}$ across the block boundaries along the horizontal direction is estimated according to relation (7):

$$B_h = \frac{1}{M_F([N_F/8]-1)}\sum_{i=1}^{M_F}\sum_{j=1}^{N_F-1} |Y_{1h}(i, 8j)| \quad (7)$$

where, [·] is rounding operator.

8. Similar to steps 5-7, calculate a vertical average $B_v$ from differencing signal $Y_{1v}$ between neighboring pixels in each block along each vertical line to obtain the vertical average difference value along the vertical boundaries of the image.

9. Generate the noise power $Y_2$ as $$Y_2 = \frac{B_h + B_v}{2}$$

and provide to the Q parameter estimator 204.

Figure 6:
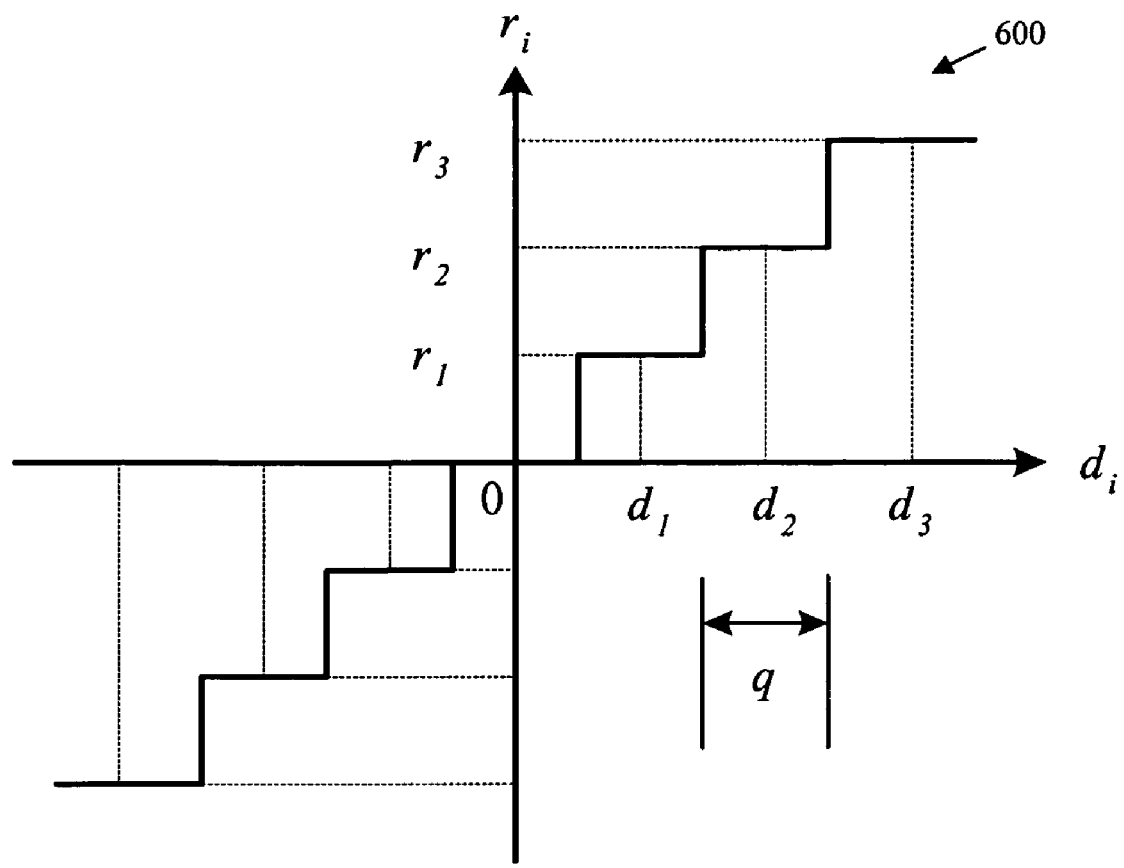
FIG. 6 shows the relationship between quantization decision and reconstruction levels.

It is known that the quantization noise power from a linear quantizer of spacing q in a uniformly distributed signal according to relation (8):

$$\sigma_N^2 = \frac{1}{q}\cdot\int_{-\frac{q}{2}}^{\frac{q}{2}} x^2\,dx = \frac{q^2}{12}. \quad (8)$$

Where x is an input signal. In MPEG coding, the signal comprises DCT coefficients and, apart from the intra DC coefficient, has a highly non-uniform probability distribution. The simple expression for the quantization noise power, therefore, is replaced by the general relation (10) for each coefficient as:

$$\sum_{i=1}^{M} \frac{1}{d_{i+1} - d_i} \cdot \int_{d_i}^{d_{i+1}} p(x)(x - r_i)^2 \, dx \tag{10}$$

where, $d_i$, $i=1 \ldots M$ are the quantizer decision levels, $r_i$ are the corresponding reconstruction levels (with $d_i \leq r_i \leq d_{i+1}$) and $p(x)$ is the probability density function of the input signal x, here assumed to be a continuous function. FIG. 6 shows an example step graph 600 which represents the relationship between quantization decision and reconstruction levels. The vertical axis represents the reconstructed values $r_i$ while the horizontal axis shows the quantizer decision level $d_i$ spaced by a quantization step size q. For an example, when a continuous signal x is input and if the value is in the range between $d_i-q/2$ and $d_i+q/2$, then the decision value is $d_i$ and the reconstructed value is $r_i$ as shown by step graph 600 in FIG. 6.

If the quantizer has 2N+1 uniformly spaced reconstruction levels centered on zero (as defined, for example, in the MPEG specification for intra coefficients) and has a decision threshold offset parameter L (L=0 corresponds to truncation and L=1 to rounding), then the expression for the quantization noise power $\sigma_N^2$ is according to relation (11) below:

$$\sigma_N^2 = 2\left[\int_0^{(1-L/2)q} p(x)x\,dx + \sum_{i=1}^{N} \frac{1}{q} \int_{(i-L/2)q}^{(i+1-L/2)q} p(x)(x - iq)^2 \, dx \right]. \tag{11}$$

Relation (11) above depends only on three quantities:
 i. The quantizer level spacing q, which is known from the quantizer scale and is estimated according to the present invention.
 ii. The decision threshold offset parameter L. This is not known but it is reasonable to suppose that it takes the compromise value 0.75 in the case of intra coding, as defined in the MPEG Test Model.
 iii. The probability distribution p(x) of the input signal.

It follows that the quantization scale can be estimated if the shape of the probability distribution of the input signal and noise power can be found. That information is not directly available, but in principle possible to be estimated from the reconstructed signal at the output of the inverse quantizer.

In image processing theory it is common to model the probability distribution of a signal such as a particular DCT coefficient, by a function specified by one or two parameters. For example, the Laplacian, or two-sided exponential distribution, is often used:

$$p(x) = \frac{\alpha}{2} e^{-\alpha|x|}.$$

The shape of the distribution is determined by the single parameter $\alpha$. If this parameter can be estimated from the decoded DCT coefficients, the quantization parameter q can be calculated because the noise power $Y_2$ can be used as an alternative noise power based on the Parseval's theorem. Indeed, the noise power in the DCT domain is according to relation (12):

$$\sigma_N^2 = \frac{2}{\alpha^2} - \frac{q \cdot e^{\alpha \cdot q(\frac{L}{2}-1)}}{\alpha(1 - e^{-\alpha \cdot q})} [\alpha \cdot q(1 - L) + 2]. \tag{12}$$

wherein the parameter $\alpha$ depends on the activity of the original picture (image) or prediction error signal at the spatial frequency represented by the particular DCT coefficient under consideration. In principle, source picture (material) might exhibit different levels of activity at different frequencies. In practice, however, it is found that there is a degree of interdependence between the activity levels across the spectrum. This is not surprising if it is observed that features that contribute to high activity, such as edges, have energy over a wide range of spatial frequencies.

It is, therefore, reasonable to suppose that large variations possible in the shapes of the probability distributions for all the DCT coefficients can be parameterized by a single quantity which describes the overall activity of the source. Then, the quantization parameter q can be estimated from this single 'activity' parameter $\alpha$ together with the noise power. In practice, for example, $\alpha$ is assigned to 0.08.

According to the present invention, the estimated noise power $Y_2$ in noise power calculator 202 (FIG. 2) can replace actual noise power in the DCT domain $\sigma_N^2$ according to relation (13):

$$\sigma_N^2 = \eta \cdot Y_2^2. \tag{13}$$

Then, estimating the quantization parameter q involves minimizing the value represented by relation (14):

$$q = \arg\min_q \left( \sigma_N^2 - \frac{2}{\alpha^2} + \frac{q \cdot e^{\alpha \cdot q(\frac{L}{2}-1)}}{\alpha(1 - e^{-\alpha \cdot q})} [\alpha \cdot q(1 - L) + 2] \right). \tag{14}$$

Relation (14) provides the procedure to minimize the error between the noise power obtained from the previous procedures and the theoretical equation for estimating q.

However, the quantization parameter may be calculated recursively. Therefore, an alternative calculation for fast processing, such as real-time applications, can be according to relation (15):

$$\sigma_N^2 = (\beta \cdot Y_2^2) = \frac{q^2}{12}. \tag{15}$$

Where, $\beta$ is predefined constant based on empirical results. In practice, as a reference value of the constant $\beta$, one can set it to 1.234.

While the present invention is susceptible of embodiments in many different forms, these are shown in the drawings and have herein been described in detail, preferred embodiments of the invention with the understanding that the present disclosure is to be considered as an exemplification of the principles of the invention and is not intended to limit the broad aspects of the invention to the embodiments illustrated. The aforementioned example architectures above according to the present invention can be implemented in many ways, such as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for estimating quantization factor of a compressed digital input image encoded by an encoder, comprising:
   employing an image processor for:
      detecting flat regions of an input compressed image by finding and excluding the strong edges or texture regions from the input compressed to generate essentially homogeneous regions, wherein finding and excluding the strong edges or texture regions further includes:
         performing low-pass filtering on the input compressed image signal $Y_{IN}$ using a n×m window at each pixel location (x, y) to generate a filtered signal $Y_L$;
         applying four directional sobel filtering operators to the filtered image $Y_L$ to find image edges $Y_H$, each directional filter providing an edge location along the direction;
         obtaining a binary map $Y_B$ based on the image edges $Y_H$ using a threshold by applying a threshold value $\tau$;
         removing spots caused by noisy information of the input compressed image and refinishing the edges to obtain refined edge regions $Y_M$;
         generating a flat binary map $\overline{Y}_B$ as a function of the refined edge regions $Y_M$;
         generating flat region data $Y_1$ by multiplying the input compressed image signal $Y_{IN}$ and the flat region binary map $\overline{Y}_B(x, y)$ indicating only flat areas in the input compressed image signal $Y_{IN}$;
      calculating an estimated noise power of the detected flat regions;
      comparing the estimated noise power with a statistical model to determine a quantization parameter used in an encoder when the input compressed image was compressed;
      providing the quantization parameter as a quality measure of the input compressed image.

2. The method of claim 1 wherein calculating the estimated noise power based on the detected regions further includes:
   separating the input compressed image represented by the flat region data signal $Y_1$ into non-overlapped blocks of pixels;
   denoting the flat region $Y_1(x, y)$ signal as $M_F \times N_F$ rectangular area for x ∈[1, $M_F$] and y ∈[1, $N_F$], and calculating a differencing signal $Y_{1h}$ between neighboring pixels in each block along each horizontal line;
   computing an average $B_h$ of said differences $Y_{1h}$ across block boundaries along the horizontal direction;
   calculating a differencing signal $Y_{1v}$ between neighboring pixels in each block along each vertical line;
   computing an average $B_v$ of said differences $Y_{1v}$ across block boundaries along the vertical direction; and estimating the noise power $Y_2$ as a function of $B_h$ and $B_v$.

3. An image enhancement system comprising:
   an image processor comprising:
      a quantization estimator for estimating quantization factor of a input compressed image encoded by an encoder, the quantization estimator including:
         a detector for detecting flat regions of the input compressed image susceptible to having block artifacts, wherein the detector further finds and excludes strong edges or texture regions in the input compressed image to generate essentially homogeneous regions by;
            performing low-pass filtering on the input compressed image signal $Y_{IN}$ using a n×m window at each pixel location (x, y) to generate a filtered signal $Y_L$;
            applying four directional sobel operators to the filtered image $Y_L$ to find image edges $Y_H$;
            obtaining a binary map $Y_B$ based on the image edges $Y_H$ using a threshold by applying a threshold value $\tau$;
            removing spots caused by noisy information of the input compressed image and refinishing the edges to obtain refined edge regions $Y_M$;
            generating a flat binary map $\overline{Y}_B$ as a function of the refined edge regions $Y_M$;
            generating flat region data $Y_1$ by multiplying the input compressed image signal $Y_{IN}$ and the flat region binary map $\overline{Y}_B(x, y)$ indicating only flat areas in the input image $Y_{IN}$;
         a noise power estimator for calculating an estimated noise power based on the detected flat regions;
         a quantization parameter estimator for comparing the estimated noise power with a statistical model to determine the quantization parameter used in the encoder when the input compressed image was compressed;
      wherein the quantization estimator outputs the quantization parameter as a quality measure of the input compressed image.

4. The system of claim 3 wherein the noise power estimator estimates noise power based on the detected regions by:
   separating the input compressed image represented by the flat region data signal $Y_1$ into non-overlapped blocks of pixels;
   denoting the flat region $Y_1(x, y)$ signal as $M_F \times N_F$ rectangular area for x ∈[1, $M_F$] and y ∈[1, $N_F$], and calculating a differencing signal $Y_{1h}$ between neighboring pixels in each block along each horizontal line;
   computing an average $B_h$ of said differences $Y_{1h}$ across block boundaries along the horizontal direction;
   calculating a differencing signal $Y_{1v}$ between neighboring pixels in each block along each vertical line;
   computing an average $B_v$ of said differences $Y_{1v}$ across block boundaries along the vertical direction; and
   estimating the noise power $Y_2$ as a function of $B_h$ and $B_v$.

* * * * *